United States Patent
Starz

(10) Patent No.: US 10,252,426 B2
(45) Date of Patent: Apr. 9, 2019

(54) HANDLING MODULE FOR HANDLING MOTOR VEHICLE WHEELS

(75) Inventor: Reiner Starz, Weil der Stadt (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 13/985,597

(22) PCT Filed: Jan. 12, 2012

(86) PCT No.: PCT/EP2012/000115
§ 371 (c)(1),
(2), (4) Date: Aug. 15, 2013

(87) PCT Pub. No.: WO2012/110176
PCT Pub. Date: Aug. 23, 2012

(65) Prior Publication Data
US 2013/0320687 A1     Dec. 5, 2013

(30) Foreign Application Priority Data

Feb. 16, 2011   (DE) .................. 10 2011 011 423

(51) Int. Cl.
| | | |
|---|---|---|
| B25J 15/02 | (2006.01) | |
| B25J 15/00 | (2006.01) | |
| B25J 15/10 | (2006.01) | |

(52) U.S. Cl.
CPC ........... *B25J 15/0052* (2013.01); *B25J 15/10* (2013.01)

(58) Field of Classification Search
CPC ....... B65G 47/90; B25J 15/0253; B25J 15/10; B25J 15/0052; B65B 21/18
USPC ..... 294/119.1, 207, 87.26, 87.1; 157/14, 16, 157/20
See application file for complete search history.

(56) References Cited

U.S. PATENT DOCUMENTS

| | | | | |
|---|---|---|---|---|
| 4,443,147 | A * | 4/1984 | Richards ................ | B65G 61/00 414/744.3 |
| 5,127,695 | A * | 7/1992 | Zoeten ........................ | 294/67.33 |
| 7,226,270 | B2 * | 6/2007 | Hwang et al. ............. | 414/749.1 |
| 8,075,238 | B2 * | 12/2011 | Wirz ..................... | B65G 1/0407 294/119.1 |
| 8,573,918 | B2 * | 11/2013 | Lawson et al. ............... | 414/741 |
| 9,725,252 | B2 * | 8/2017 | Starz ...................... | B65G 47/52 |
| 2008/0095604 | A1 * | 4/2008 | Jeon ....................... | B65G 47/90 414/794.5 |

(Continued)

FOREIGN PATENT DOCUMENTS

| | | | | |
|---|---|---|---|---|
| JP | 06170658 A * | 6/1994 | ............. | B23P 19/00 |
| JP | H06 170658 A | 6/1994 | | |

(Continued)

*Primary Examiner* — Gabriela M Puig
(74) *Attorney, Agent, or Firm* — Schroeder Intellectual Property Law Group, LLC

(57) ABSTRACT

A handling module for handling vehicle wheels in an installation for the surface treatment thereof and having at least two gripping units which are supported by a frame structure and each of which comprises a plurality of press-on elements which are pressable onto one or more counter surfaces of an individual vehicle wheel. At least one of the gripping units includes a translation device by which the press-on elements are movable in relation to the frame structure with a movement component which is parallel to the axis of rotation of a gripped vehicle wheel.

19 Claims, 5 Drawing Sheets

(56) References Cited

U.S. PATENT DOCUMENTS

2009/0035107 A1    2/2009  Duran et al.
2014/0064903 A1*  3/2014  Starz et al. ................ 414/751.1

FOREIGN PATENT DOCUMENTS

JP      2008 260 110 A    10/2008
JP      2010 094796 A    4/2010

\* cited by examiner

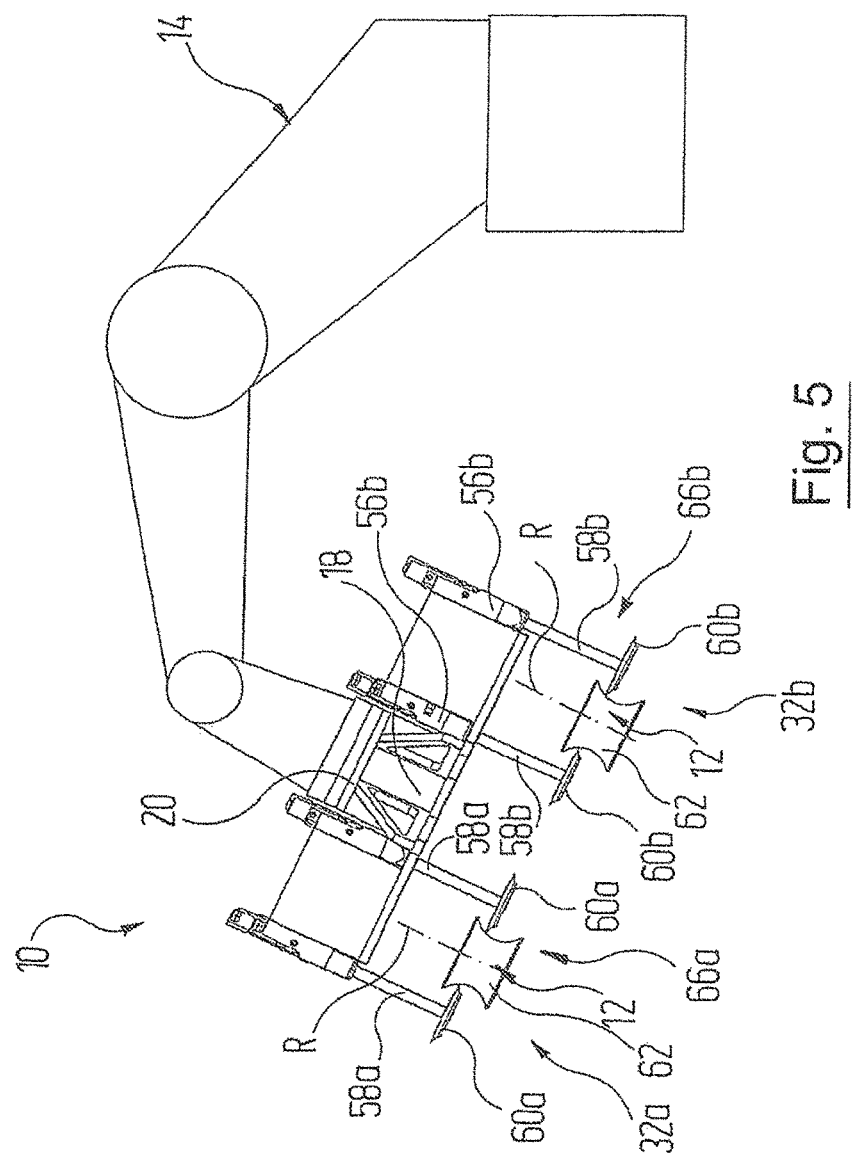

HANDLING MODULE FOR HANDLING MOTOR VEHICLE WHEELS

RELATED APPLICATIONS

The application claims the filing benefit of International Patent Application No. PCT/EP2012/000115, filed Jan. 12, 2012, which claims the filing benefit of German Patent Application No. 10 2011 011 423.8 filed Feb. 16, 2011, the contents of both of which are incorporated herein by reference.

FIELD OF THE INVENTION

The invention relates to a handling module for handling vehicle wheels, in a system for the surface treatment thereof, having at least two gripping units which are carried by a frame structure and whereof each includes a plurality of contact pressure elements which may be pressed against one or more counter-surfaces of an individual vehicle wheel.

BACKGROUND OF THE INVENTION

Light metal wheels of motor vehicles, customarily called alloy rims, are coated in surface treatment systems comprising a powder or another coating material. Then the coating is stoned in an oven. For this purpose, the vehicle wheels are transferred from a coating station to an oven. Vehicle wheels made of other materials, in particular steel wheels, are also treated in successive operating steps. In general terms, vehicle wheels have to be transferred from one operating station to another operating station regardless of their material.

For this purpose, handling modules of the type mentioned at the outset which are known from the market are used, and to this end these are fastened to a multiaxial robot arm so that transfer may be performed with as many degrees of freedom of movement as possible.

In known handling devices, all the vehicle wheels received thereby are kept immobile in relation to the handling device; it is not possible to alter the position of the vehicle wheels later in relation to, for example, the frame structure.

However, every vehicle wheel has structural tolerances which may result in two vehicle wheels that are gripped by the handling module at the same time having different overall heights. This may have the result that the transfer from one operating region to the next is not performed as precisely as is wished. If for example vehicle wheels are deposited on horizontal carrying structures, the placement regions of the vehicle wheels, at which they are deposited on these carrying structures, should ideally lie in a common horizontal plane.

It is thus an object of the invention to provide a handling device of the type mentioned at the outset which takes account of these ideas.

SUMMARY OF THE INVENTION

This object may be achieved with a handling device of the type mentioned at the outset in that at least one of the gripping units has a translational device by means of which the contact pressure elements may be moved in relation to the frame structure by a motion component parallel to the axis of rotation of a gripped vehicle wheel.

As a result of this measure, according to the invention it is thus possible on the one hand to alter the relative position of at least one vehicle wheel along its axis of rotation and in relation to a further vehicle wheel after it has already been received by the handling module. On the other hand, before a vehicle wheel is received the contact pressure elements may be put into a position which compensates for structural non-uniformity in both the vehicle wheels and the handling module itself, so that all vehicle wheels are largely in contact with the same contact pressure points on the contact pressure elements. Moreover, it is also possible for two or more vehicle wheels of different types to be gripped by the handling module at the same time, since it is also possible to compensate for structural differences which are not a matter of tolerance.

Here, it is particularly advantageous if the contact pressure elements are movable by means of the translational device in relation to the frame structure in a manner coaxial to the axis of rotation of the gripped vehicle wheel. This eliminates the possibility of parallel displacement of the moved vehicle wheel. Parallel displacement of the moved vehicle wheel is undesirable in particular if the vehicle wheels are deposited at defined spacings from one another in different operating stations.

It is advantageous if a plurality, preferably all, of the gripping units each include a translational device. In this way, the axial position of all the vehicle wheels received by a respective gripping unit may be altered and adapted to one another.

Preferably, the contact pressure elements of a first gripping unit are movable independently of the contact pressure elements of a second gripping unit. In this way, the respective axial position of a plurality of vehicle wheels received by the handling device may be adjusted individually.

It is favourable if the gripping units are set up such that vehicle wheels gripped by the gripping units are aligned axially parallel to one another in relation to their axis of rotation.

In this way, it is possible for vehicle wheels arranged in a plane to be received by the handling device quickly and efficiently.

In practice, it has proved advantageous if the contact pressure elements of a gripping unit are each carried by a rod element and constructed as contact pressure plates which may be pressed by means of their outer rim against an outer face of a vehicle wheel. The rod element together with the contact pressure plate forms a type of piston unit, so that the position of the contact pressure plate may be moved by hydraulics, electric motor or pneumatics.

For secure handling of a vehicle wheel, a gripping unit includes at least three rod elements having a contact pressure plate. Preferably, four such units are present.

If at least one position of the contact pressure elements in relation to the frame structure may be detected by means of at least one sensor device, the robot-assisted sequence of motion of the handling device, and the gripping and the release of a vehicle wheel may be adjusted to the vehicle wheels that are in each case present or to be anticipated.

Here, it is particularly favourable if the sensor device is set up such that each position of the contact pressure elements is detectable. In this way, not just one or a few important positions of the contact pressure elements may be detected but, rather, all the positions that the contact pressure elements can adopt.

It is to be understood that the aspects and objects of the present invention described above may be combinable and that advantages and aspects of the present invention will become apparent upon reading the following description of the drawings and detailed description of the invention.

BRIEF DESCRIPTION OF THE DRAWINGS

An exemplary embodiment of the invention will be explained in more detail below with reference to the drawings, in which:

FIG. 5 shows schematically a multiaxial robot arm which carries a handling module.

DETAILED DESCRIPTION OF THE PRESENT INVENTION

Figure 1:
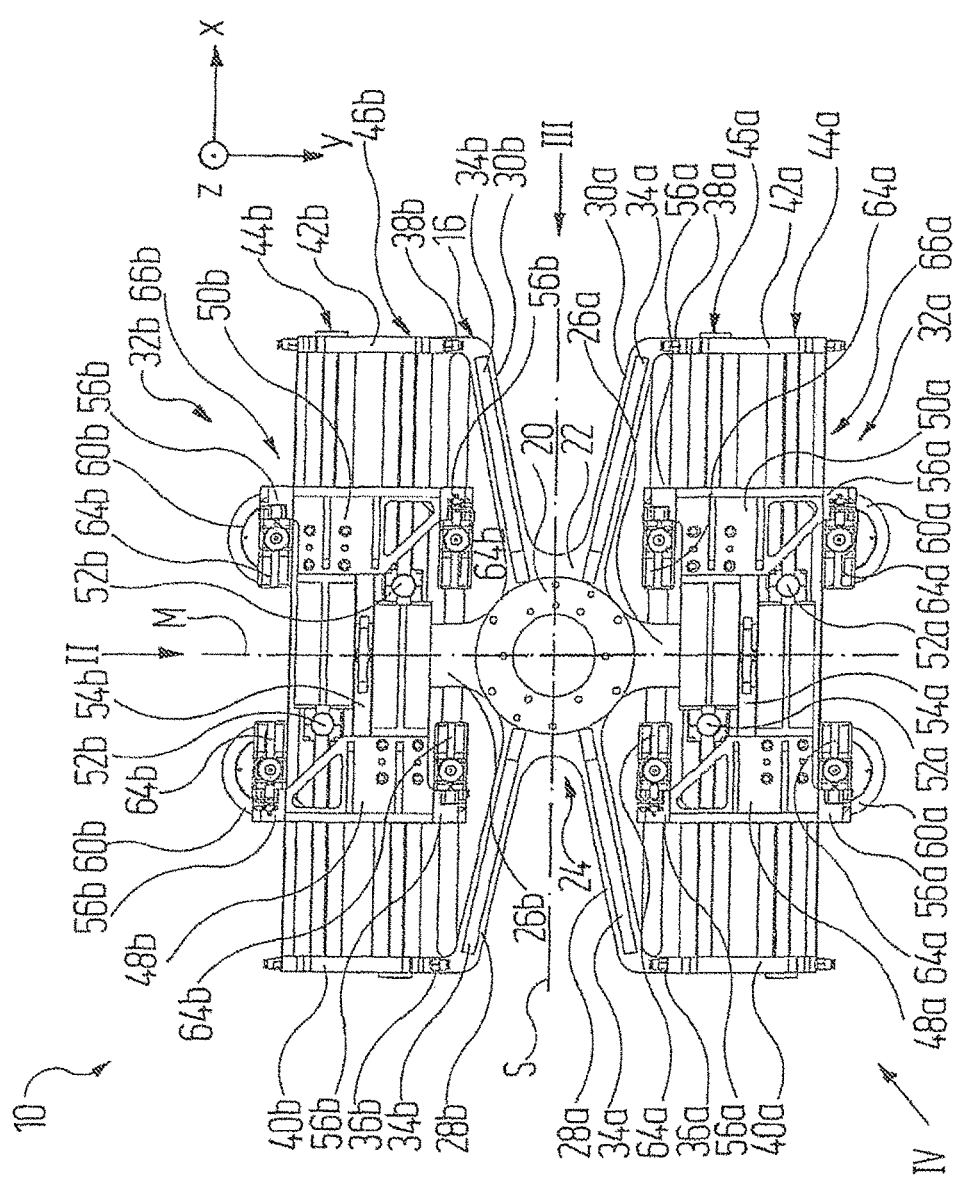
FIG. 1 shows a view from above of a handling module for handling vehicle wheels.
Figure 2:
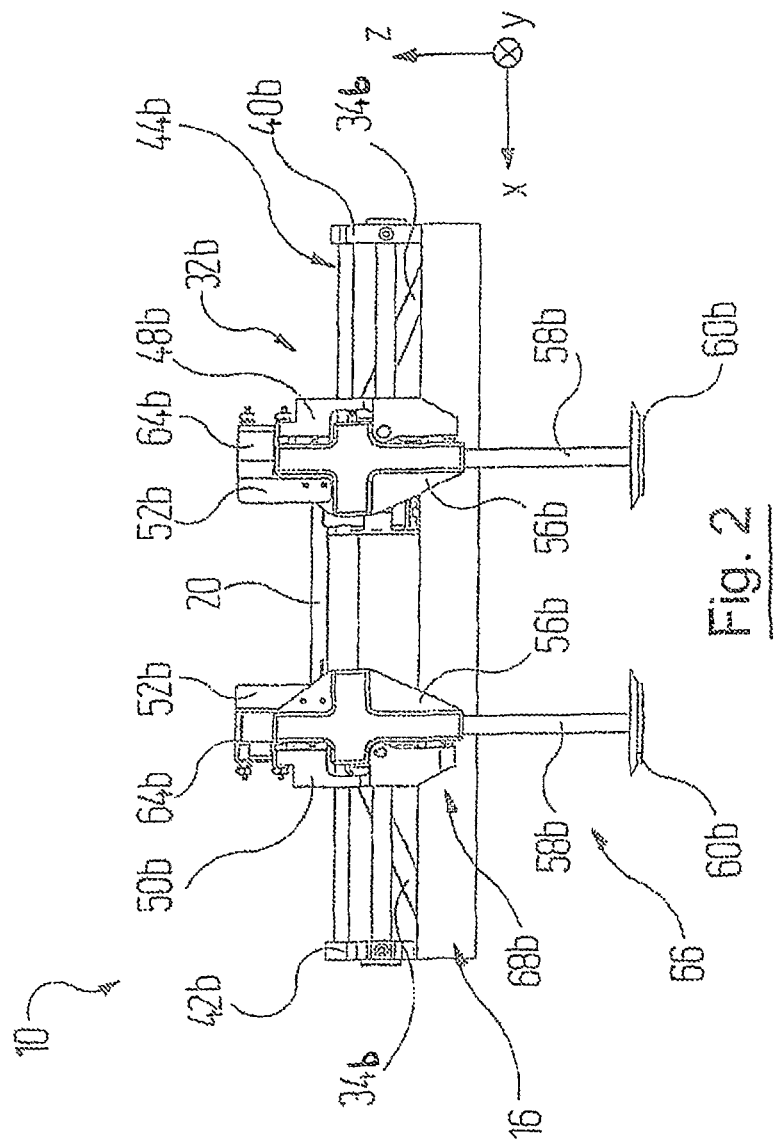
FIG. 2 shows a side view of the handling module in FIG. 1, from the direction of view of the arrow II there.
Figure 3:
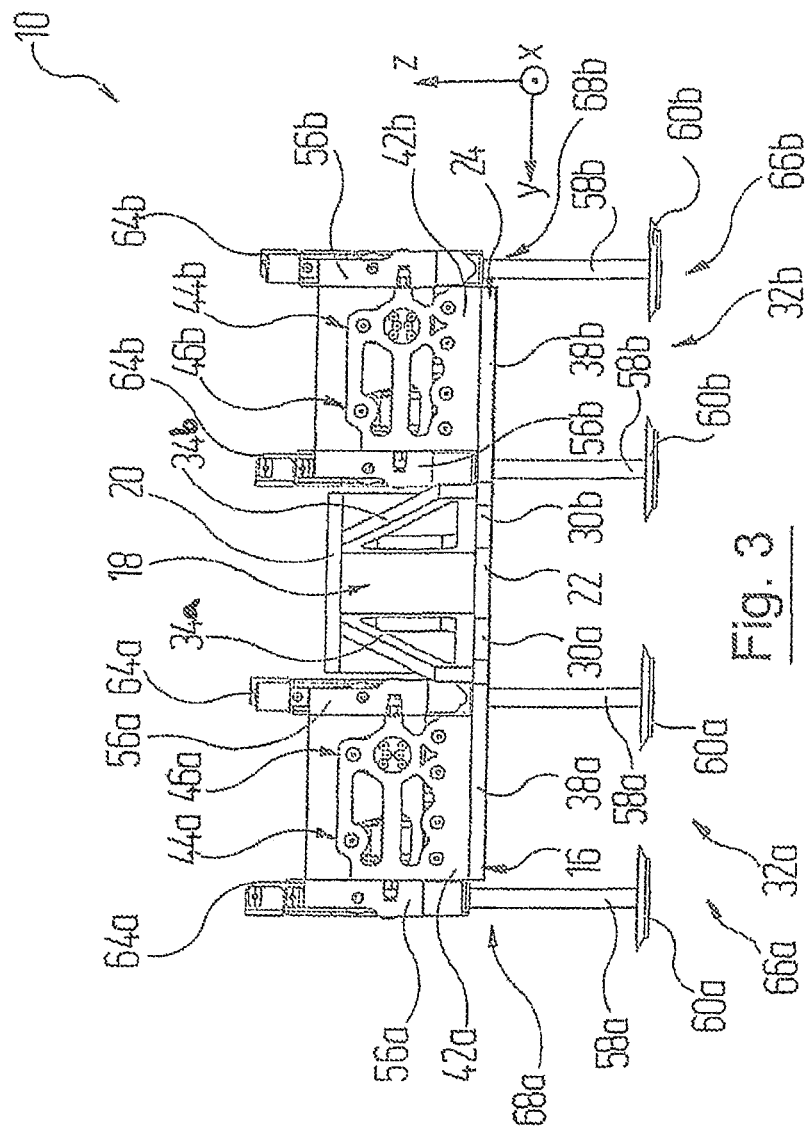
FIG. 3 shows a side view of the handling module in FIG. 1, from the direction of view of the arrow III there.
Figure 4:
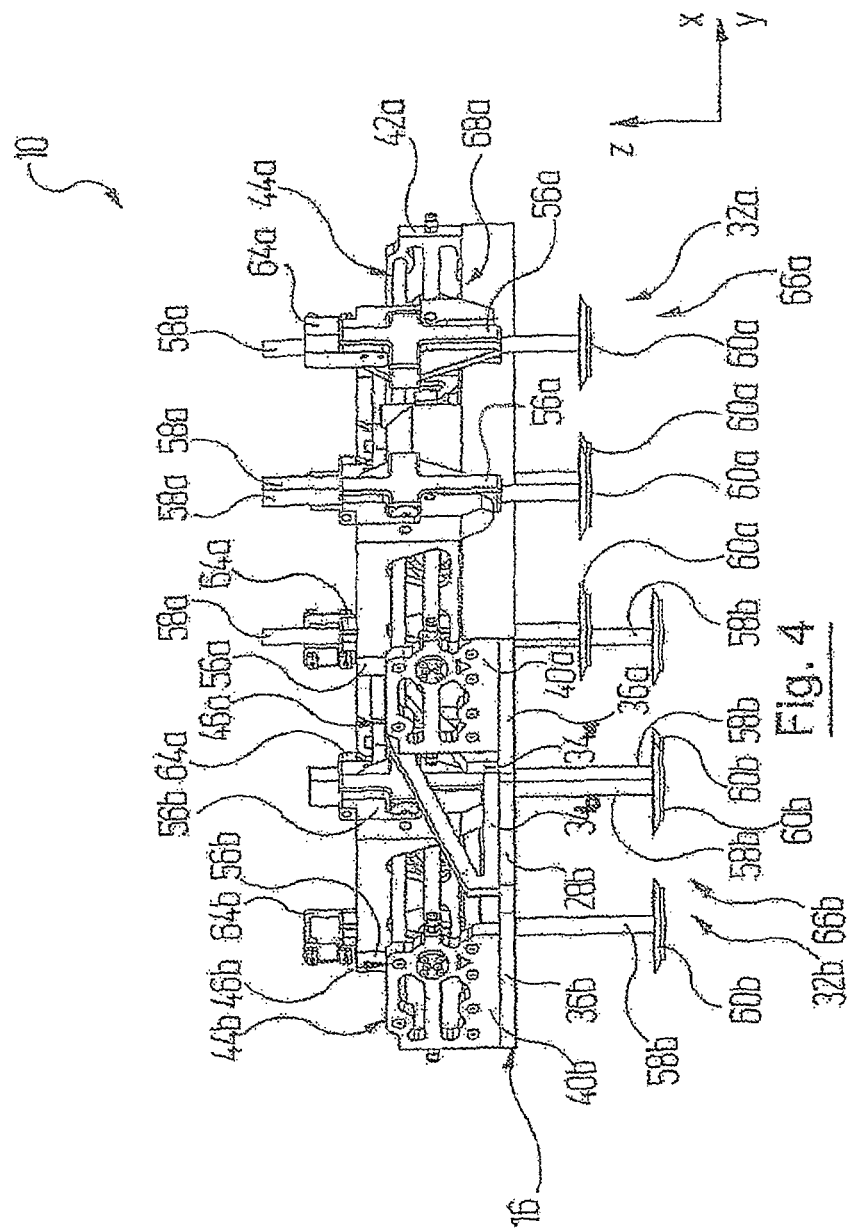
FIG. 4 shows a side view of the handling module in FIG. 1, from the direction of view of the arrow IV there, in which in each case four contact pressure plates of a gripping unit are shown at different vertical positions.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIG. 1, 10 designates overall a handling module with the aid of which vehicle wheels 12, which are shown only in FIG. 5, are handled in a system in which the surface of the vehicle wheels 12 is treated. There, vehicle wheels 12, in particular light metal wheels of aluminium, are transferred with the aid of the handling module 10, for example from a coating station to an oven.

For this purpose, the handling module 10 is fastened to a multiaxial handling robot 14, as known per se and illustrated schematically, also only in FIG. 5, in which the handling module 10 is provided with only a few reference numerals overall for the sake of clarity.

Let us assume that a coordinate system, shown in each of FIGS. 1 to 4, is associated with the handling module 10 such that it cannot rotate in relation thereto, with the result that it moves in space with the latter. Here, let the z direction point upwards, the x direction to the left and the y direction forwards. Thus, the respective opposing direction is to define downwards, to the right and to the rear.

The handling module 10 includes a frame structure 16 having a centrally arranged bearing block 18. The latter carries on its upper side a fastening flange 20 by means of which the handling module 10 may be coupled to the robot 14.

On the underside, remote from the fastening flange 20, the bearing block 18 is connected to a central base portion 22 of a star-shaped carrier plate 24 which extends parallel to the fastening flange 20 in an xy plane. Two main webs 26a, 26b project from the base portion 22, in the directions forwards and to the rear.

The main web 26a is flanked on either side respectively by a narrow web 28a and a narrow web 30a which extend radially from the base portion 22 of the carrier plate 24. Correspondingly, the main web 26b is flanked to the right and left side respectively by a narrow web 28b and a narrow web 30b.

The main web 26a carries, with the narrow webs 28a and 30a, a first (in this case front) gripping unit 32a, and the main web 26b carries, with the narrow webs 28b and 30b, a second (in this case rear) gripping unit 32b.

The handling module 10 is mirror-symmetrical in relation to an xz plane S, shown only in FIG. 1, which extends through the longitudinal axis of the bearing block 18. In the text below, only the front gripping unit 32a will be discussed in detail. What is said in this regard applies analogously and correspondingly to the rear gripping unit 32b; the components thereof bear the same reference numerals, with a lower-case letter b instead of a lower-case letter a. Indications of directions forwards and to the rear and right and left which are mentioned in respect of the front gripping unit 32a apply in reverse to the rear gripping unit 32b in each case.

The narrow webs 28a, 30a carry on their upper side respective triangular frames 34a, as a result of which the frame structure 16 is stiffened as a whole in order to counter torsion thereof when the handling module 10 is used.

At their free ends, the narrow webs 28a, 30a merge into a respective side web 36a and 38a, and these extend parallel to one another in the y direction, that is to say forwards, in an xy plane. On their upper side, these side webs 36a, 38a carry a respective side panel 40a, 42a which are each arranged in a yz plane.

The side panels 40a, 42a bear two rail arrangements, a front rail arrangement 44a and a rear rail arrangement 46a, each having three rail rods which have not been given separate reference numerals here and which extend perpendicular to the side panels 40a, 42a. Here, two lower rail rods of a rail arrangement 44a, 46a extend in a common xy plane, while the third rail rod is arranged in an xy plane lying above this. Moreover, the two respectively lower rail rods of the rail arrangements 44a, 46a extend in the same xy plane.

Carriages 48a and 50a run on the rail arrangements 44a, 46a, with each carriage 48a, 50a being coupled by means of a front bearing portion to the front rail arrangement 44a and by means of a rear bearing portion to the rear rail arrangement 46a. The carriages 48a, 50a each carry along with them an electric motor 52a which allows them to be moved by motor along the rail arrangements 44a, 46a.

The two carriages 48a and 50a are in this case coupled to one another by way of a toothed rack 54a such that in all cases movement is by both carriages 48a, 50a and this movement is always symmetrical to a yz plane M which extends through the which through the longitudinal axis of the bearing block 18. This yz plane is also shown only in FIG. 1.

At their opposing ends, the carriages 48a, 50a each carry a bearing cheek 56a. Each bearing cheek 56a for its part bears a downwardly projecting rod 58a which carries coaxially at its lower end a contact pressure plate 60a, with the result that the latter extends in an xy plane. The contact pressure plates 60a may act as a contact pressure element, pressing against the wheel outer face 62 (cf. FIG. 5), which serves as a counter-surface, of a vehicle wheel 12.

The contact pressure plates 60a may have different constructions, depending on the intended use of the handling module 10 and on where on the wheel outer face 62 of the vehicle wheel 12 they act. For example, they may be made from plastics and be relatively thick if they act on the wheel shoulder. In contrast, if they are in contact in the region of the wheel seat they will, rather, be of flat construction. When a freshly coated vehicle wheel 12 is to be gripped the contact pressure plate 60a will have a sharp outer rim so that there is only a small contact surface between it and the vehicle wheel 12.

In the present exemplary embodiment, each gripping unit 32a, 32b includes four bearing cheeks 56a having a rod 58a and a contact pressure plate 60a. In principle, it is sufficient if only three of these arrangements are present on each gripping unit 32a, 32b.

Each rod 58a having the contact pressure plate 60a is borne by the associated bearing cheek 56a in a guide channel, not provided with a separate reference numeral, such that it is upwardly and downwardly displaceable. Moreover, each bearing cheek 56a carries along with it its own electric motor 64a, which is coupled to the respective rod 58a so that the latter can be displaced up or down by motor.

In this way, the bearing cheeks 56a with the rods 58a with contact pressure plate 60a and the electric motors 64a form a translational device 66a by means of which the vehicle wheel 12 gripped by the gripping unit 32a is movable in relation to the frame structure 16 by a motion component parallel to the axis of rotation R of the gripped vehicle wheel 12 (see FIG. 5). As a result, the axial position of the vehicle wheel 12 can be adjusted in relation to the frame structure 16. In concrete terms, a vehicle wheel 12 gripped by the handling module 10 may be moved coaxially in relation to its axis of rotation R.

Here, the axis of rotation R of a vehicle wheel 12 gripped by the gripping unit extends parallel to the z direction.

In the present exemplary embodiment, a translational device 66a, 66b is associated with both gripping units 32a, 32b. In some cases, it may be sufficient if only one translational device 66a or 66b is present.

Moreover, the frame structure 16 also carries two sensor devices 68a and 68b which are associated with a respective gripping unit 32a and 32b. With the help of these, the position of the contact pressure plates 60a, 60b of a respective gripping unit 32a, 32b in relation to the frame structure 16 and hence in relation to one another may be detected. For this purpose, sensor techniques as known from the prior art may be used. Magnetostrictive sensors may be mentioned here by way of example.

Because the sensor devices 68a, 68b are mounted on the frame structure 16 at a distance from the contact pressure plates 60a, 60b and hence also at a distance from the vehicle wheels 12 gripped by these, the risk of soiling the sensor devices 68a, 68b is reduced.

Overall, in the handling module 10 all the components that are sensitive to dirt, such as in particular the bearing of the moving parts, are provided in the region of the frame structure 16 that is remote from the contact pressure plates 60a, 60b.

In each case, two vehicle wheels 12 are gripped by the handling module 10 at the same time. For this purpose, the carriages 48a, 50a and 48b, 50b are respectively moved on the rail arrangements 44a, 46a and 44b, 46b by means of the associated electric motors 52a, 52b far enough away from one another for the contact pressure plates 60a, 60b to move away from one another as well until in each case four cooperating contact pressure plates 60a and 60b may receive a vehicle wheel 12 between them. As a result of the sensor devices 68a, 68b, here the position of the contact pressure plates 60a, 60b is monitored, so that they may be put into a position in which they can be guided over a vehicle wheel 12 while maintaining a minimal safety clearance.

As a result of the sensor devices 68a, 68b the paths travelled by the contact pressure plates 60a, 60b and the carriages 48a, 48b and 50a, 50b may be optimised such that the components concerned perform no superfluous movements.

In particular, the speed of the griping movement of the contact pressure plates 60a, 60b may be adjusted depending on whether an uncoated or coated vehicle wheel 12 is to be gripped. In the case of an uncoated vehicle wheel 12, the movement to be performed by the contact pressure plates 60a, 60b for this purpose may be performed significantly faster than in the case of a coated vehicle wheel 12, for which the movement takes place correspondingly more slowly in order not to adversely affect the coating.

In the event that an empty handling module 10 is to receive two vehicle wheels 12 or two as yet untreated vehicle wheels 12 are taken up, the robot-assisted movement of the handling module 10 may take place very rapidly. If for example vehicle wheels 12 that are provided with a fresh powder coating are gripped by the handling module 10, by contrast, the movement of the handling module 10 by the robot 14 takes place relatively slowly, so that there is no effect on the fresh coating.

The handling module 10 cooperates with a central controller (not shown separately), from which it receives data on the type of vehicle wheels 12 to be gripped next. As a result, the contact pressure plates 60a, 60b may already be moved into the suitable position in advance, as a result of which the time for accessing the vehicle wheels 12 is optimised accordingly.

Then, the handling module 10 is guided by means of the robot 14 over two correspondingly positioned vehicle wheels 12 until the contact pressure plates 60a, 60b each surround the outer faces 62 of the respective vehicle wheel 12 in the peripheral direction.

Thereupon the pairs of carriages 48a, 50a and 48b, 50b are moved towards one another again, during which the vehicle wheels 12 are centred in relation to the centre plane M automatically, by virtue of the toothed racks 54a, 54b.

In the present exemplary embodiment, the gripping units 32a, 32b are thus set up such that vehicle wheels 12 gripped by the gripping devices 32a, 32b are aligned axially parallel to one another in relation to their axis of rotation R.

The translational devices 66a and 66b may displace a vehicle wheel 12 gripped by a gripping unit 32a or 32b in the direction of its axis of rotation R, individually and independently of the other vehicle wheel 12. In this way, it is possible to compensate for tolerances in the case of two vehicle wheels 12 received by the handling module 10 which result in the vehicle wheels 12 predetermining differently the depositing levels at which they have to be transferred to further operating stations.

In a modification which is not shown separately here, a plurality of handling modules 10 may be fastened to a type of carrying rake which for its part is coupled to the robot 14. In this way, the robot 14 may guide two, three, four or indeed more handling modules 10 at the same time, as a result of which four, six, eight or a corresponding number of vehicle wheels 12 may be handled at the same time. In this arrangement, it is also possible for all the vehicle wheels 12 to be moved individually into a position along their respective axis of rotation R.

Overall, the handling module described above is of inherently modular construction. The bearing cheeks 56a, 56b and all the associated components are in each case of the same construction and so can be replaced as a whole at all points. As a result of this, servicing and maintenance costs can be reduced.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A handling module for handling vehicle wheels in a system for the surface treatment thereof, the handling module comprising:
    at least two gripping units each gripping unit comprising a carriage which is carried by a frame structure, each gripping unit being capable of gripping one single vehicle wheel, and whereof each gripping unit further comprises a plurality of contact pressure elements which are capable of being pressed against one or more counter-surfaces of an individual vehicle wheel,
    and wherein a plurality of gripping units from the at least two gripping units each include a translational device by which the contact pressure elements are movable in relation to the frame structure and associated carriage by a motion component perpendicular to the frame structure to change the distance between the frame structure and the contact pressure element and between the carriage and the contact pressure element, wherein the motion component is also parallel to an axis of rotation of a gripped vehicle wheel,
    wherein each single vehicle wheel gripped by the contact pressure elements of a gripping unit from the plurality of gripping units can be moved along the vehicle wheel's respective axis of rotation relative to the frame structure and the carriage by its respective contact pressure elements, independent of any movement or lack of movement by any other contact pressure elements or other vehicle wheels gripped by other contact pressure elements.

2. A handling module according to claim 1, wherein contact pressure elements of a first gripping unit are movable independently of contact pressure elements of a second gripping unit.

3. A handling module according to claim 1, wherein the gripping units are configured such that vehicle wheels gripped by the gripping units are aligned axially parallel to one another in relation to their axis of rotation.

4. A handling module according to claim 1, wherein contact pressure elements of a gripping unit are each carried by a rod element and constructed as contact pressure plates which are capable of being pressed by means of an outer rim of the pressure plates against an outer face of a vehicle wheel.

5. A handling device according to claim 4, wherein a gripping unit includes at least three rod elements having a contact pressure plate.

6. A handling device according to claim 1, wherein at least one position of the contact pressure elements in relation to the frame structure is capable of being detected by at least one sensor device.

7. A handling device according to claim 6, wherein the at least one sensor device is configured such that each position of the contact pressure elements is detectable.

8. A handling device according to claim 1, wherein each single vehicle wheel is made of metal.

9. A handling device according to claim 1, wherein each single vehicle wheel is engaged by its respective gripping unit by an outer rim of each of the plurality of contact pressure elements for the respective gripping unit.

10. A handling module for handling vehicle wheels in a system for the surface treatment thereof, the handling module comprising:
    at least two gripping units each gripping unit comprising a plurality of carriages and a plurality of contact pressure elements, wherein each gripping unit is carried by a frame structure and is capable of gripping one single vehicle wheel with its plurality of contact pressure elements,
    wherein each carriage carries a translational device, each translational device including a contact pressure element from the plurality of contact pressure elements, wherein each contact pressure element is movable by its translational device in relation to the frame structure and its associated carriage in a direction perpendicular to the frame structure independent of any contact pressure elements associated with any other gripping unit.

11. The handling module of claim 10 wherein each carriage is coupled to at least two rail arrangements, each carriage being movable laterally along the at least rail arrangements in a direction perpendicular to a direction of movement of the contact pressure elements.

12. The handling device according to claim 11, wherein each carriage includes a motor, the motor facilitating lateral movement of the carriage along the at least two rail arrangements.

13. The handling device according to claim 12, wherein each translation device includes a second motor, the second motor facilitating movement of the contact pressure element associated with the translation device and the carriage.

14. The handling module according to claim 10, wherein each contact pressure element is carried by a rod element and constructed as contact pressure plates which are capable of being pressed by means of an outer rim of the pressure plates against an outer face of a vehicle wheel.

15. The handling device according to claim 14, wherein a gripping unit includes at least three rod elements having a contact pressure plate.

16. The handling device according to claim 14, wherein each single vehicle wheel is made of metal.

17. The handling device according to claim 14, wherein each single vehicle wheel is engaged by its respective gripping unit by an outer rim of each of the plurality of contact pressure elements for the respective gripping unit.

18. The handling device according to claim 10, wherein at least one position of the contact pressure elements in relation to the frame structure is capable of being detected by at least one sensor device.

19. The handling device according to claim 18, wherein the at least one sensor device is configured such that each position of the contact pressure elements is detectable.

* * * * *